Oct. 11, 1966    A. N. JOHANNESEN    3,277,699
QUICKLY DETACHABLE COUPLING MEMBER GAGING DEVICE
Filed Nov. 12, 1963                        5 Sheets-Sheet 1

INVENTOR

*Allan N. Johannesen*

BY *Harry M. Saragovitz,*
*Edward J. Kelly &*
*Herbert Berl*
                       ATTORNEYS.

Oct. 11, 1966  A. N. JOHANNESEN  3,277,699
QUICKLY DETACHABLE COUPLING MEMBER GAGING DEVICE
Filed Nov. 12, 1963  5 Sheets-Sheet 4

INVENTOR
Allan N. Johannesen
BY Harry M. Saragovitz,
Edward J. Kelly &
Herbert Berl
ATTORNEYS.

Oct. 11, 1966

A. N. JOHANNESEN 3,277,699

QUICKLY DETACHABLE COUPLING MEMBER GAGING DEVICE

Filed Nov. 12, 1963

INVENTOR
Allan N. Johannesen

BY Harry M. Saragovitz,
Edward J. Kelly &
Herbert Berl
ATTORNEYS.

United States Patent Office 3,277,699
Patented Oct. 11, 1966

3,277,699
QUICKLY DETACHABLE COUPLING MEMBER GAGING DEVICE
Allan N. Johannesen, Holliston, Mass., assignor to the United States of America as represented by the Secretary of the Army
Filed Nov. 12, 1963, Ser. No. 323,181
28 Claims. (Cl. 73—94)

The invention described herein, if patented, may be manufactured and used by or for the Government, for governmental purposes, without the payment to me of any royalty thereon.

The invention relates to means for gaging the female coupling members of quickly detachable couplings such as those illustrated in Military Standard, Coupling Assembly, Quick Disconnect, Cam Locking Type, No. MS 27,019 dated September 23, 1960. In such couplings, it is important that the cams carried by the female coupling member engage the cam surface or surfaces of the male coupling member and draw the members together telescopically to a sealed position without requiring the application of more than a predetermined maximum amount of force or torque. At the same time, it is important that the relative telescopic movement of the members be within predetermined limits so that the gasket which is interposed between the coupling members is uniformly compressed to at least a predetermined minimum degree as the actuating cams move to the coupling locking position. Thus, a uniform seal is obtained with each coupling and such seal is accomplished by the use of not more than a predetermined amount of force or torque.

Hitherto, the sole means for testing or gaging the force required to move the cams to the locking positions has been to apply an appropriate torque wrench or the like to the actuating arm for each cam and visually try to read both gages at the same time while simultaneously and manually actuating the lever arms for the cams in a locking direction. This is an extremely inaccurate gaging method because it is almost impossible to apply manual pressure equally on both wrenches simultaneously. Likewise, it is equally difficult to read both gages at the same time. Moreover, such an arrangement fails utterly to provide any means for measuring the relative telescopic movement of the coupling members and the degree of compression of the interposed gasket.

With the foregoing in view, it is an object of the invention to provide novel means for gaging or testing female coupling members of the quickly detachable type aforesaid.

A further object is to provide in such a gaging device, novel combined means for simultaneously actuated both cams of the coupling member with equal force, measuring the force required to actuate each cam, while, at the same time, accurately measuring the relative travel of the coupling members in a gasket compressing direction.

A further object is to provide novel means for actuating the cams of a coupling of the type described together with novel means for simultaneously measuring the force required to move each cam to its locking position.

A further object is to provide novel means for measuring the linear movement of a coupling member of the class described in a gasket compressing direction under the impetus of the coupling locking cams aforesaid and/or the degree of compression of the interposed gasket.

A further object is to provide a novel combined gaging device of the type described which can be readily and quickly adjusted or modified to enable coupling members of a variety of sizes to be gaged or tested.

Other objects and advantages reside in the specific structure of the invention, the structure of the several elements comprising the same, combinations and subcombinations of such elements or assemblies of the same, all of which will be readily apparent to those skilled in the art upon reference to the attached drawing which illustrates one species of the invention and to the following specification wherein the invention is described and claimed.

Referring specifically to the drawing, wherein like reference characters designate like parts in all views, and referring at first to FIGURES 1, 2 and 3, 10 designates any suitable base or foundation on which the apparatus is fixedly mounted. An electric motor 11 is fixed to the base 10 rearwardly thereof. The electric motor 11 is a gear type, speed reduction, reversible motor and receives electric current from any suitable source through lead 9, to an outlet box 8, thence through leads 12 and 13 from a double throw toggle switch 14. One extreme position of the switch 14 operates the motor in one direction while the other extreme position reverses the motor in a manner readily understood. An "On" and "Off" toggle switch 15 may be used to supply current to the circuit and switch 14. One extreme position of the double throw switch 14 causes certain parts to be described later to rotate at a uniform speed through a predetermined arc, say 100°. The other extreme position causes the same parts to be reversely rotated through the same arc. A middle position of switch 14 allows the motion to be stopped at any point desired by the operator. Limit switches, to be described later, limit the movements of the parts to the predetermined arcs aforesaid.

Figure 2:
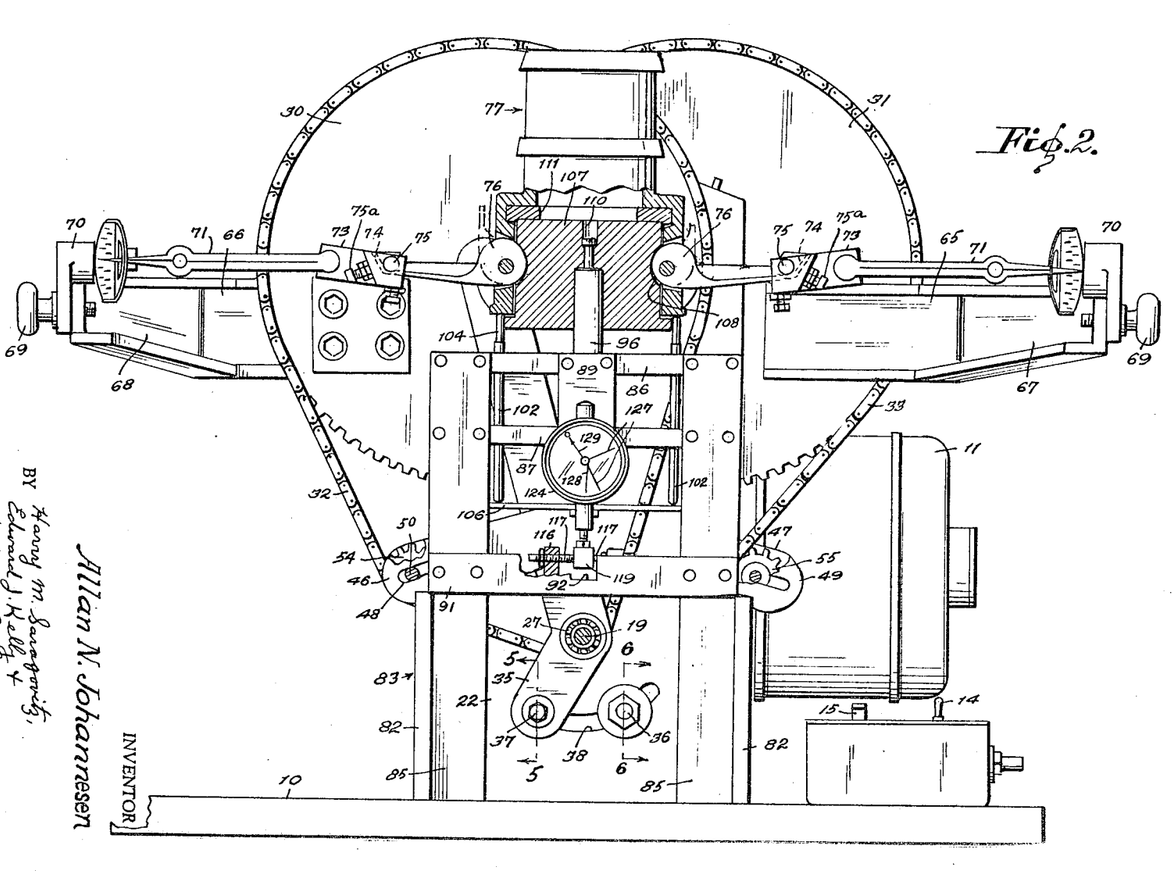
FIGURE 2 is a front elevational view thereof parts being broken away.
Figure 3:
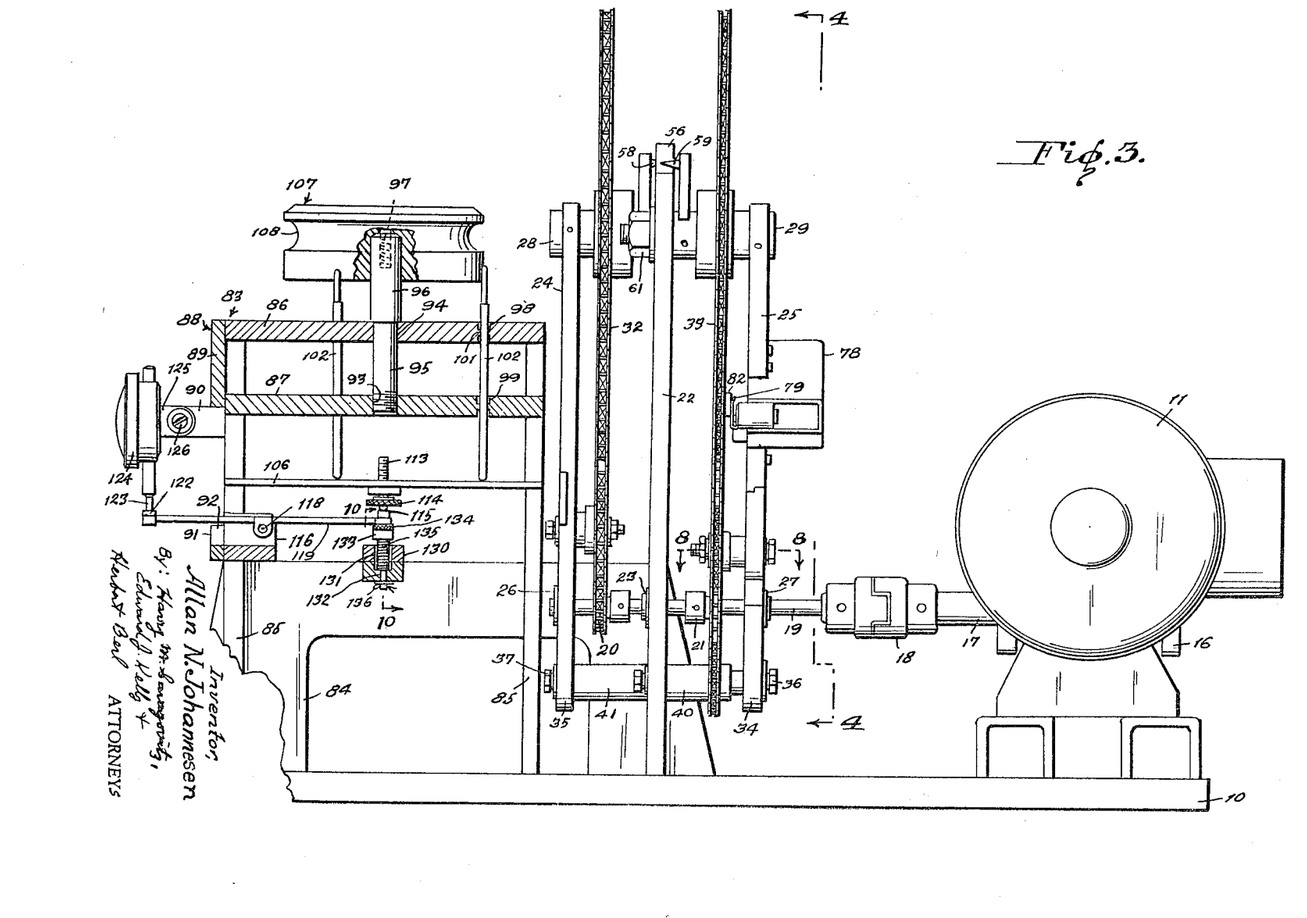
FIGURE 3 is a side elevational view looking from the right of FIGURE 1, parts being omitted and parts being shown in longitudinal vertical section.
Figure 5:
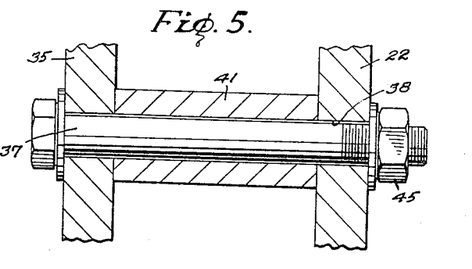
FIGURES 5 and 6 are enlarged, fragmentary, vertical sectional views taken respectively on the planes of the lines 5—5 and 6—6 of FIGURE 2.
Figure 6:
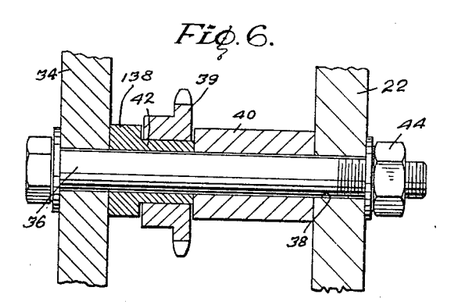

A reduction gearing, not shown, is housed in a suitable housing 16 from which extends a drive shaft 17 which is coupled by any suitable readily detachable coupling 18 to a driven shaft 19. As best seen in FIGURE 3, front and rear sprockets 20, 21 respectively are fixed on said driven shaft 19 in longitudinally spaced relation. An upright plate or pedestal 22 is fixed to the base plate 10 between sprockets 20, 21. Driven shaft 19 is journalled in pedestal 22 by any suitable bearing 23. Front and rear sprocket arms 24 and 25 respectively are freely pivoted on the driven shaft 19 forwardly and rearwardly of the upright plate 22 by any suitable bearings 26 and 27. The rear sprocket arm 25 at the upper end thereof has fixed thereto a forwardly extending stub shaft 29. In like manner the upper end of the front sprocket arm 24 has fixed thereto a rearwardly directed stub shaft 28. Front and rear driven sprockets 30, 31 respectively are journalled on the stub shafts 28, 29 and are connected to the lower or drive sprockets 20, 21 by front and rear drive chains 32, 33. The lower or drive sprockets 20, 21 are substantially smaller than the driven sprockets 30, 31 whereby to provide a further reduction gearing for the drive. As best seen in FIGURES 2, 5 and 6, the lower ends 35, 34 of the front and rear sprocket arms 24, 25 respectively extend below and laterally outwardly of the driven shaft 19. They are formed with holes therethrough through which extend rearwardly and forwardly extending bolts 37 and 36 respectively. Bolts 36, 37 extend through an arcuate slot 38 formed through the upright plate or pedestal 22. Spacer sleeves 40, 41 are journalled on the bolts 36, 37 between sprocket arm ends 34, 35 respectively and the pedestal 22. As best seen in FIGURE 6, an idler sprocket 39 is journalled on a bearing portion 42 of a second spacer sleeve 138 between sleeve 40 and arm 34 end. Idler 39 is in mesh with the rear drive chain 33 for a purpose to be apparent. Nuts 44, 45 on the ends of the bolts 36, 37 respectively may be tightened to secure the sprocket arms 24, 25 in selected angular positions relative to the driven shaft 19 or loosened to shift such angles in a manner readily understood and for a purpose to be apparent later.

Figures 4, 10:
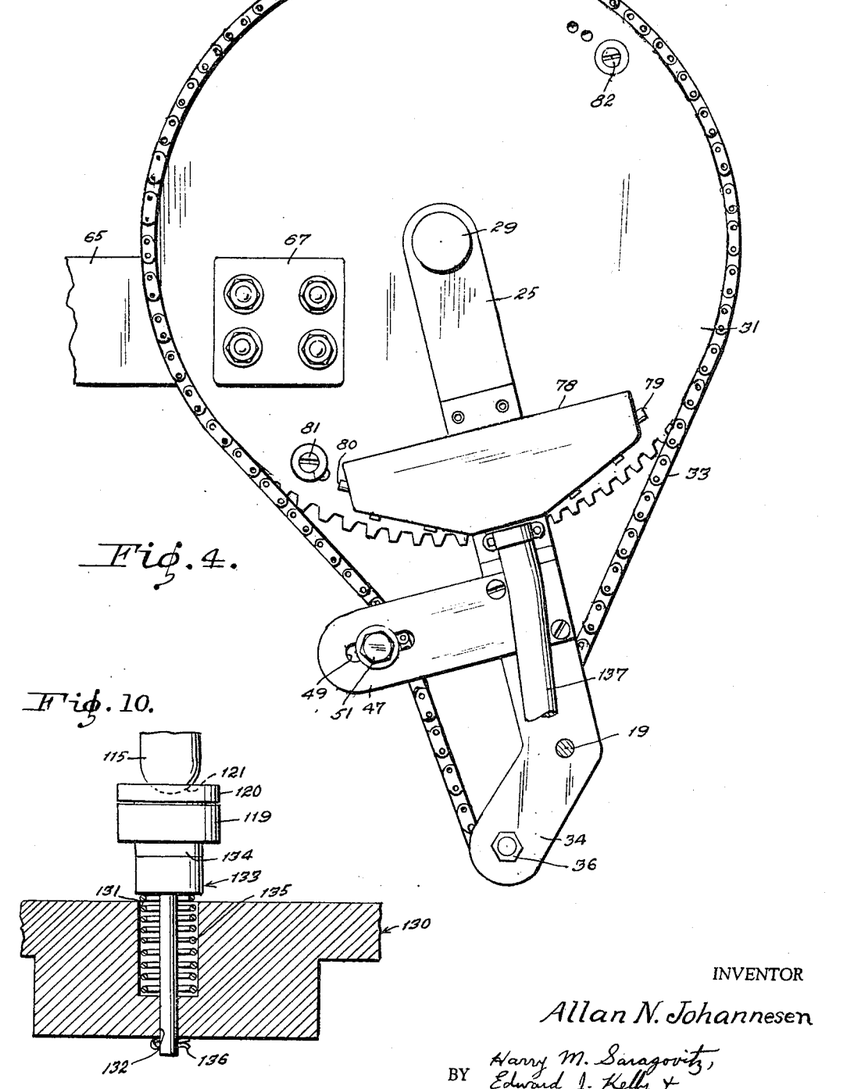
FIGURE 4 is a vertical sectional view taken on the line 4—4 of FIGURE 3, parts being omitted.
FIGURE 10 is an enlarged, fragmentary, vertical sectional view taken substantially on the planes of the lines 10—10 of FIGURE 3.
Figure 8:
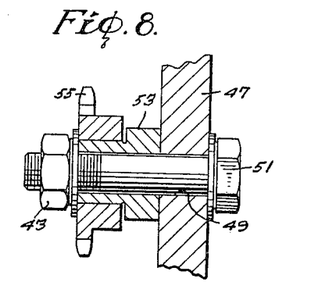
FIGURE 8 is an enlarged, fragmentary, horizontal sectional view taken substantially on the plane of the line 8—8 of FIGURE 3.

The front and rear sprocket arms 24, 25 each respectively have a laterally outwardly and diagonally downwardly extending idler arm 46 and 47 which are formed with diagonally outwardly and downwardly directed slots 48, 49, see FIGURES 4 and 8. Bolts 50, 51 extend through said slots and mount journals 53 thereon for idler sprockets 54, 55 which are in mesh with the chains 32, 33. Nuts, as 43, FIGURE 8 provide for adjusting the sprockets 54, 55 whereby to provide means for tightening the drive chains 32, 33.

As shown in FIGURE 2, the drive chain 32 for the front driven sprocket 30 extends around the drive sprocket 20 and idler sprocket 54 in a normal manner whereby to turn sprocket 30 in the same direction as the driven shaft 19 is turned, in this instance in a clockwise direction, as the apparatus is viewed in FIGURE 2. However, as seen in FIGURES 2 and 4, the chain 33 for the driven sprocket 31 extends therefrom inside the chain tightening idler sprocket 55, around the idler sprocket 39 on bolt 36 and thence, FIGURE 4, inside drive sprocket 21. The effect of this arrangement is to turn driven sprocket 31 in a counter-clockwise direction as viewed in FIGURE 2. Thus, both driven sprockets 30, 31 are turned in opposite directions at the same rate of speed.

Figure 1:
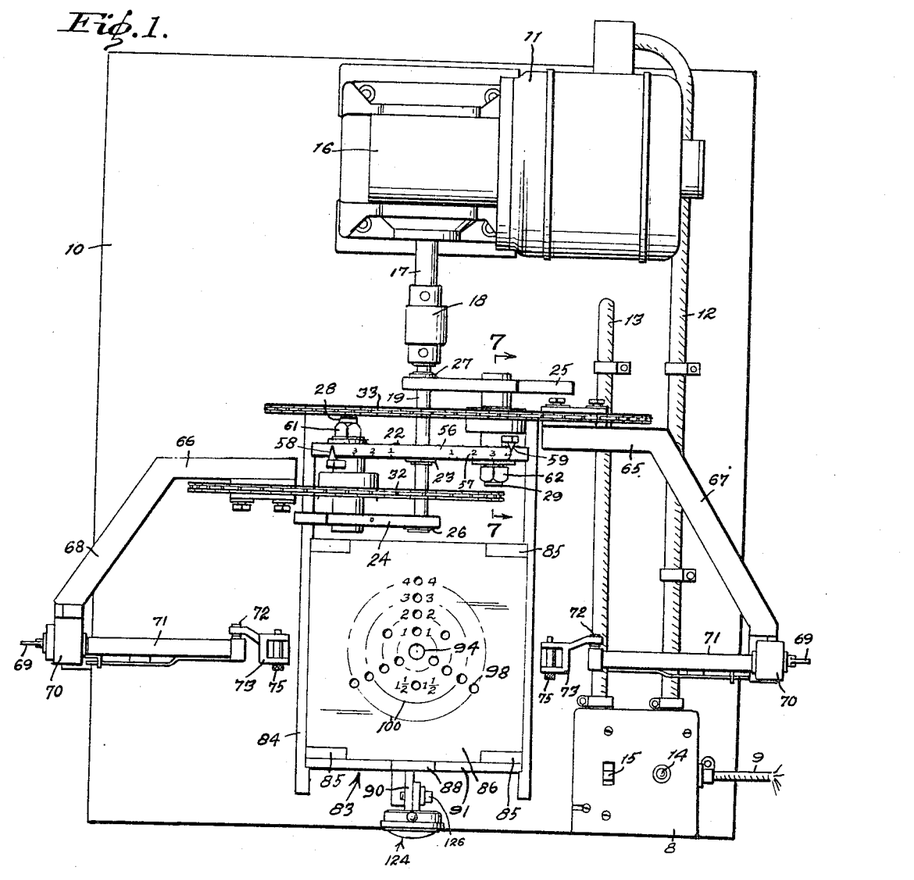
FIGURE 1 is a top plan view of a preferred species of the invention parts being omitted.
Figure 7:
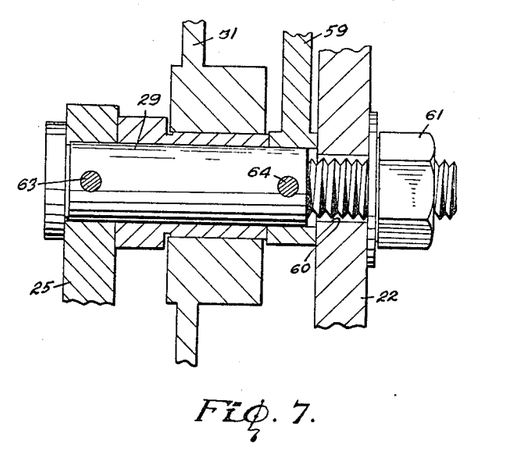
FIGURE 7 is an enlarged, fragmentary, vertical sectional view taken substantially on the plane of the line 7—7 of FIGURE 1.

As best seen in FIGURES 1 and 3, the upper edge 56 of the pedestal 22 is arcuate and is inscribed with suitable indicia 57. Rigid front and rear pointers 58 and 59 are respectively fixed to stub shafts 28, 29 so as to overlie such upper edge 56. Stub shafts 28, 29 extend through an arcuate slot 60, FIGURE 7, in the upper portion of the pedestal 22. They are secured in selected positions along the slot 60 by nuts 61 and 62. Stub shafts 28, 29 are secured against rotation in the sprocket arms 24, 25 by any suitable means such as the cross pins 63, FIGURE 7. In like manner, the pointers 58, 59 are fixed to the same stub shafts by any suitable means such as the cross pins 64, FIGURE 7. Thus, with the nuts 44, 45, 61, 62 loosened, the sprocket arms 24, 25 and stub shafts 28, 29 may be adjusted in the slots 38 and 60 to cause the axis of the driven sprockets 30, 31 to be moved closer or further apart as desired for a purpose to be apparent.

Rear and front lifting arms 65, 66 respectively are fixed to the rear and front driven sprockets 31, 30 so as to extend radially outwardly thereof and in substantially horizontal, coplanar relation in a starting position, see FIGURE 2. Lifting arms 66, 65 have diagonally forwardly extending forward portions 68, 67 of unequal length so as to terminate in a common vertical plane, see FIGURE 1. Socket-like holders 70 are readily detachably secured to the forward free ends of the extensions 67, 68 by any suitable means such as the thumb screws 69. Such sockets or holders 70 are substantially axially aligned when the parts are in the starting position and are adapted to have seated therein the handle ends of a pair of torque wrenches 71 of any suitable type such as the dial and pointer type illustrated. It is understood that the wrenches 71 are to be readily replaceable when necessary and that they are preferably of the type which gives a signal, audible or otherwise to signify when a selected torque has been reached or exceeded. For instance torque wrenches like those disclosed in U.S. Patents Nos. 2,283,707 or 2,553,311 may be used. The studs 72, FIGURE 1, at the forward ends of the socket wrenches 71 are readily detachably seated in or connected to the correspondingly shaped sockets of a pair of holders or cam retainers 73 which are adapted to receive therein the free ends of cam handles or levers 74, FIGURE 2, and readily detachably secure the same therein by any suitable means such as the removable retainer pins 75 and clamping screws 75a. Here again, the cam retainers 73 are in spaced and opposed substantially horizontal alignment when the parts are in starting position of FIGURES 1 and 2.

It is apparent from the foregoing that with the parts in the starting positions aforesaid, if the motor 11 is started in a forward direction, driven sprockets 30, 31 will be rotated in opposite directions so as to raise lifting arms 65, 66 and the handle ends of torque wrenches 71 connected thereto. As is shown in FIGURE 2, the axes of the cams 76 of a female coupling member 77 are coaxial with the stub shafts 28, 29 whereby the torque required to elevate the cam handles or levers 74 is registered by the pointers and dials of the torque wrenches 71. Such movement of the lifting arms 65, 66 continues until the motor is stopped by limit switch means now to be described.

As best seen in FIGURES 3 and 4, the rear sprocket arm 25 has fixed to the rear surface thereof a casing 78 for any suitable limit switch, not shown, which includes actuating means in the form of spring fingers 79, and 80 which protrude from the front surface of the sprocket arm 25. These are alternately contacted and compressed to break the circuit to motor 11 by any suitable means such as the screw heads 81, 82 on the rear face of the rear sprocket 31. Such screw heads 81, 82 are substantially 180 degrees apart and serve to limit rotation of the sprockets to approximately 100 degrees. The arrangement is such that when the sprocket 31 is rotating in a direction to cause actuator 82 to engage the spring finger 79 to cause the same to break the circuit, the operator must then reverse the two-way switch 14 to cause reverse rotation of the sprockets until the other switch actuator 81 operatively engages the other spring finger 80 which returns the parts to the starting position. The limit switch in housing 78 is connected to the circuit by any suitable cable 137, FIGURE 4.

It follows from the foregoing, that a coupling member 77 to be gauged is readily mounted between the cam retainers 73. Then when the motor 11 is actuated in a forward direction, both cams 76 will be rotated to an operative position simultaneously and with equal pressure upon each. The force required to perform this will be measured on the dials of the torque wrenches 71. Alternately, if only coupling members requiring too much force are to be rejected, the wrenches 71 may be set to give a signal when the maximum allowable torque has been exceeded. Thus, if either wrench gives the signal, the operator can reject that coupling member and proceed with gauging the next one. However, this arrangement does not provide any means for gauging the downward movement of the coupling member 77 under the action of the cams 76 and consequent degree of compression of the washer 111 seated in the coupling member. This is accomplished by means now to be described.

Axial movement of the coupling member 77 is measured by means mounted on a table 83 which includes side supports 84 having rear ends which straddle the upright plate or pedestal 22 and which are secured thereto by welds, bolts or the like, not shown, to provide a rigid connection therewith. Front and rear legs 85 are also provided. A table top assembly is supported by the legs and side members and comprises an upper guide plate, plate 86, and a subjacent lower guide plate 87. An indicator mounting bracket 88 comprising a back plate 89, and a forwardly extending apertured ear 90 spans the front edges of the upper and lower guide plates 86, 87 centrally thereof. A balance strap 91 spans the front legs 85 in downwardly spaced relation to the indicator mounting bracket 88. Strap 91 has a rectangular notch 92 formed in its upper edge centrally thereof for a purpose to be apparent. The side supports 84, legs 85, upper and lower guide plates 86, 87, back plate 89 and balance sthap 91 are rigidly secured together in any suitable manner by any suitable means such as bolts or welds to provide the table 83.

The lower guide plate 87 has a threaded hole 93 formed therethrough centrally thereof. Upper guide plate 86 has an unthreaded hole 94 formed therethrough in vertical alignment with the hole 93. Holes 93, 94 receive the shank 95 of a cylindrical stud 96. Shank 95 has a threaded lower end which is screwed into hole 93. Stud 96 projects above the upper guide plate 86 a substantial distance. The upper end of stud 96 is formed with a threaded axial bore 97 for a purpose to be apparent. The upper and lower guide plates 86, 87 are each formed with a series of radially disposed and spaced holes 98 and 99 respectively. Each hole 98 is in vertical alignment with a hole 99. The upper guide plate 86 may be inscribed with a series of concentric circles 100 each intersecting the holes 98 of successive series. Each of the holes 98, 99 are formed with a reduced central portion 101, FIGURE 3, for a purpose to be apparent.

Figure 9:
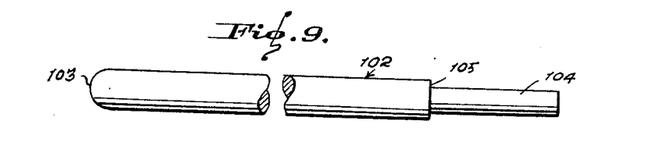
FIGURE 9 is an elevational view on a larger scale of an element of the invention, parts being broken away.

In the embodiment illustrated, there are four radiating series or groups of holes 98, 99. Three groups are equally spaced circumferentially with the fourth being staggered relative thereto. Holes 98, 99 receive therein sensing elements 102, FIGURE 9, which may comprise steel rods having cylindrical bodies with rounded lower ends 103 and heads 104 of reduced cylindrical shape which merge with the bodies by means of annular shoulders 105. Sensing rods 102 have a body diameter so related to the reduced central portions 101 of the holes 98, 99 to have a free sliding fit therein. The rounded lower ends of the sensing rods 102 rest on and are supported by a wobble plate or pan 106 to be described more fully hereinafter.

The stud 96 is adapted to readily removably receive thereon any of a series of various sized gaging heads 107. Each gaging head 107 is formed as a replica of a male coupling member including a cam groove 108 for the cams 76. It includes a downwardly opening axial socket 109 which has a sliding fit on the stud 96 and is readily removably secured thereto by any suitable means such as the counter-sunk machine screw 110 which is threaded in the bore 97 of the stud 96. The gaging heads 107 are generally cylindrical and the diameter of each is such that it will sit just within the limits defined by the reduced heads 104 of the sensing elements 102 when the same are extending from a series of holes 98, 99 located on a concentric circle 100 corresponding to the size of the gaging head in question. It follows from the foregoing that with an appropriate gaging head 107 secured in position atop the stud 96, a coupling member 77 of corresponding size is loosely seated thereon with undersurface thereof resting on rods 102 and the cam levers 74 thereof connected to the holders 73 as aforesaid, actuation of the motor 11 will move the cams 76 to the coupled position while simultaneously moving the coupling member 77 axially downwardly over the gaging head 107 whereby to compress the washer 111 therein. At the same time the sensing rods 102 are forced downwardly the amount of this movement and resultant compression of the gasket 111 is measured by means now to be described.

As aforesaid, the rounded lower ends 103 of the sensing rods 102 rest on a wobble plate 106 which comprises rigid circular metal plate which is sized for a free fit within the boundaries of the table 83. It may have an increased thickness in the nature of a boss on the underside thereof axially of the same. Such boss and axial portion of the plate are formed with a tapped hole 112 therethrough into which is threaded from below an adjusting screw 113 which includes a knurled head 114 for actuating the same. An integral projection or stem 115 extends downwardly from the head 114 and terminates with a hemispherical free end.

A balance strap yoke 116 is secured rigidly to the rear of the balance strap 91 by any suitable means, such as welds or machine screws, not shown. Yoke 116 is of channel-shaped configuration with the upper surface of the web thereof flush with the floor of the balance strap notch 92 and the flanges thereof stradding such notch. Such flanges are formed with horizontal, coaxial tapped holes in which are threaded a pair of opposed balance centers 117 which seat in conical seats 118 on opposite sides of the center of a rocking beam or balance arm 119 to support the latter for limited pivotal movement in a vertical plane. The back end of the rocking beam 119, FIGURE 10, is formed with a vertical hole therethrough in which is seated the shank of an adjusting screw button 120 the upper surface of the head of which is formed with circular arcuate recess 121 for receiving therein the stem 115 of the adjusting screw 113 whereby to permit limited universally tilting of plate 106.

The front end of the rocking beam 119 extends through the notch 92 and forwardly of the balance strap 91 and is likewise formed with a vertical hole therethrough in which is seated the shank of an indicator button 122. The head of button 122 seats the lower end of the spindle 123 of a dial-type micrometer 124 which is fixed to the ear 90 of the indicator mounting bracket 88 by means of a rearwardly extending ear 125 and a locking screw 126. Thus, as the front end of the balance arm is raised, the degree of movement is registered on the dial of the micrometer 124 in a well known manner. Necessary and well known adjusting devices, not shown, are contemplated for setting the micrometer to zero prior to operation of the invention. Also, it is contemplated that the micrometer 124 in a well known manner. Necessary and FIGURE 2, which may be present to indicate the maximum and minimum coupler movement which may be permitted in a coupler 77 being tested. It is contemplated also, that the micrometer will include any suitable means such as a follower needle 128, which will move with the indicator hand 129, and remain at the point of greatest indicated travel when the indicator hand returns to zero during the unlocking action of the coupler cams 76. Thus, in FIGURE 2, the dial indicates that movement of the coupler 77 exceeded the limit allowed by the adjusting hands 127 and that the coupler is, therefore, defective.

To provide means returning the micrometers to zero and for biasing the back end of the rocking beam 119 enough to confine stem 115 and wobble plate 106 sufficiently to confine stem 115 and plate 106 between beam 119 and sensing rods 102, there has been provided a rigid metal cross piece 130, FIGURES 3 and 10, which extends transversely of the table 83 and is secured by an suitable means as screws or welds to the upper edges of the side members or supports 84 centrally thereof so the center thereof lies directly below the back end of the rocking beam 119. Such center may be of increased thickness as shown and is formed with a cylindrical socket 131 the floor of which is formed with an axially disposed hole 137 therethrough. A headed pin 133 has a rubber or like pad 134 cemented or otherwise secured to the top of the head thereof to provide a cushioned engagement with the undersurface of the back end of the rocking beam 119. A coil spring 135 surrounds the shank of the pin 133 between the head thereof and the floor of the socket 131. The pin 133 is secured in position in any suitable manner as by having the free end of the shank thereof extended through the hole 132 and anchored by any suitable fastener as the cotter pin 136. The arrangement just described provides a resilient support for the back end of the rocking beam 119 which in turn resiliently supports the wobble plate 106 and the sensing rods 102. This structure operates to average movements of unequal extent which are imparted to the individual sensing elements 102 by the closing of the cams 76.

In operation, when the cams 76 are turned to the coupler locking position, the coupling member 77 is moved downwardly so as to compress the gasket 111. This movement is sensed by the three sensing rods 102 the upper ends of which are in contact with the under surface of the coupler 77. The lower ends of the rods 102 rest on the equalizing pan or wobble plate 106 which in turn rests on the back end of the rocking beam 119. Thus, downward movement of the coupler 77 is transmitted through the sensing rods 102, averaged by the wobble plate 106, reversed by the rocking beam 119 and indicated quantitatively by the indicator hand 129 of the micrometer 124. By means of the follower needle 128 and the pre-set adjusting hands 127, the operator is free to watch the dials of the torque wrenches 70 while the gaging operation is taking place and can thereafter glance at the micrometer 124 to learn the degree of washer compression which took place.

When couplers of a larger or smaller size are to be gaged, it is only necessary to replace the gaging head 107 with one of appropriate size and then replace the sensing rods 102 in appropriate holes 98, 99. Then the operator must adjust the driven sprockets and their lifting arms 65 and 66 until the axes of the driven sprockets 30, 31 are coaxial with the axes of the cams 76 for the new coupler 77. This is speedily accomplished by loosening the appropriate nuts as aforesaid and using the pointers 58, 59 in connection with the indicia 57 on the upper edge 56 of the pedestal 22. Such indicia designate the most used standard sized couplers whereby the adjustment may be quickly accomplished by unskilled personnel.

It is obvious from the foregoing that the invention may be operated by one person without special skills and that the gaging is accomplished rapidly and accurately. It should be understood, also, that the device may be driven by an suitable power means where electricity is not available and may even be operated by hand.

Moreover, while there has been shown and described what is now though to be a preferred species of the invention, it should be understood that the same is susceptible of other forms and expressions. Consequently, I do not limit myself to the exact structure shown and described hereinabove but only as hereinafter claimed.

I claim:

1. In a device for gaging quickly detachable hose or like couplings of the type which include a plug or male member and a socket or female member having a gasket therein against which the end of said male member is pressed when a pair of locking cams on said female coupling member are swung to operative locked positions; the combination comprising a gaging head simulating a plug coupling member for receiving the female coupling member to be gaged, means for shifting the locking cams on the said female coupling member in a direction to lock said coupling member on said head and thereby compress the gasket therein an amount corresponding to the amount the gasket would be compressed in the actual use of said coupling, a micrometer gage and means forming an operative connection between said gage and female coupling member effective to cause said gage to indicate the extent said gasket is compressed when said locking cams are moved to operative position.

2. The combination of claim 1, wherein said means for shifting said locking cams includes means moving both cams simultaneously and with equal force.

3. A device for gaging female coupling members having a compressible gasket therein, said gasket being compressed when said coupling member is moved axially into coupled relation with a counterpart coupling member, comprising a fixedly mounted gaging head simulating a counterpart coupling member to receive said female coupling member to be gaged, means for locking said coupling member on said head including means shifting said coupling member axially in a direction to compres said gasket an amount corresponding to the compression of the same in actual use, a micrometer gage, means forming an operative connection between said coupling member and said gage, and said last named means being operative to indicate the extent said gasket is compressed as said coupling member is locked on said gaging head.

4. A device for gaging female coupling members having a gasket therein which is compressed when said coupling members are forced into operative coupling relation with counterpart coupling members comprising a fixedly mounted gaging head to receive the female coupling member to be gaged, means for locking the said female coupling member upon said head and thereby shifting the same in a direction to compress said gasket, a plurality of sensing elements actuated by said coupling member during locking thereof, a micrometer gage and means to form an operative connection for actuating said gage in response to movement of said sensing elements including averaging mechanism to produce a reading on said gage that is an average of the movements imparted to the individual sensing elements by the coupling member being gaged.

5. A gaging device as defined in claim 4, wherein supporting means is provided to support said sensing elements in any one of a plurality of groups, each of said groups being centered on the axis of said engaging head, but the groups being at different distances from the said axis to accommodate variations in the diameters of the coupling members being gaged.

6. A gaging device as defined in claim 4, wherein there are three sensing elements and supporting means is provided to support said sensing elements in any one of a plurality of triangularly arranged groups in any of which the sensing elements are equidistantly spaced from each other, respectively, the groups being centered on the axis of said gaging head but being at different distances from the said axis to accommodate variations in the diameters of the coupling members being gaged.

7. A device for gaging female coupling members having a gasket therein which is compressed when said coupling members are forced into operative relation with counterpart coupling members, comprising a fixedly mounted gaging head to receive the female coupling member to be gaged, means for locking the said female coupling member upon said head and thereby shifting the same in a direction to compress said gasket, a plurality of sensing elements actuated by said coupling member during locking thereof, a rocking beam, a micrometer gage operatively connected to one end of said rocking beam so as to indicate the extent of movement of the latter, and averaging mechanism to form an operative connection between the opposite end of said rocking beam and said sensing elements for transmitting to the beam movement which is an average of the movement imparted to the individual sensing elements by the coupling member being gaged.

8. A device for gaging female coupling members having a gasket therein which is compressed when said coupling members are forced into operative coupling relation with counterpart coupling members comprising a fixedly mounted gaging head to receive the female coupling member to be gaged, means for locking the said female coupling member upon said head and thereby shifting the same in a direction to compress said gasket, a plurality of sensing elements actuated by said coupling member during locking thereof, a rocking beam, a micrometer gage operatively connected to one end of of said rocking beam so as to indicate the extent of movement of the latter, means for biasing said beam for movement in a direction to actuate the gage to zero position and averaging mechanism to form an operative connection between the opposite end of said rocking beam and said sensing elements for transmitting to the beam movement in opposition to the bias thereof which is an average of the movement imparted to the individual sensing elements by the coupling member being gaged.

9. A device for gaging female coupling members having a gasket therein which is compressed when said coupling members are forced into operative coupling relation with counterpart coupling members comprising a fixedly mounted gaging head to receive the female coupling member to be gaged, means for locking the said female coupling member upon said head and thereby shifting the same in a direction to compress said gasket, a plurality of sensing elements actuated by said coupling member during locking thereof, a rocking beam, a micrometer gage operatively connected to one end of said rocking beam so as to indicate the extent of movement of the latter, averaging means including a plate mounted on the opposite end of said beam and means for biasing said beam and averaging means to maintain the plate in operative engagement with said sensing elements throughout the range of movement of the latter, said plate wobbling on its connection with said beam when movements of unequal extent are imparted thereto by the individual sensing elements so that the movement transmitted from said sensing elements to said beam through said averaging means is an average of the separate movements of the individual sensing elements.

10. A device for gaging female coupling members having a gasket therein which is compressed when said coupling members are forced into operative coupling relation with counterpart coupling members, comprising a fixedly mounted gaging head to receive the female coupling member to be gaged, means for locking the said female coupling member upon said head and thereby shifting the same in a direction to compress said gasket, a plurality of sensing elements actuated by said coupling member during locking thereof, a rocking beam, a micrometer gage operatively connected to one end of said rocking beam to indicate the extent of movement of the latter, a plate, a stem fixed to said plate substantially medially thereof to project normally therefrom, cooperating structure on a free end of said stem and the other end of said beam for seating said stem and plate on said beam for limited universal tilting movement, said sensing elements having lower ends resting on said plate, means for biasing said beam sufficiently at all times to confine the stem and plate between said beam and sensing elements respectively so that movements of unequal extent imparted to the individual sensing elements during gaging of said coupling member will cause said plate to wobble on its connection with said rocking beam and thereby impart to the latter movement which in extent is an average of the movements of the individual sensing elements.

11. In a device for gaging quickly detachable female coupling members of the type having an internal gasket as well as locking cams shiftable to and from coupling member locking and unlocked positions; the combination comprising a gaging head simulating the male member of the quickly detachable coupling, means mounting a female coupling member in operative relation to said gaging head with the latter engaged against said gasket, movable means for shifting simultaneously all of said locking cams of said coupling member to and from said locking and unlocked positions, individual means for indicating the force required to shift each of said cams to said locking position, and means for indicating the distance said coupling member and gaging head move telescopically relative to each other when said locking cams are shifted to said locking positions as aforesaid and hence the amount said gasket in said coupling member is compressed.

12. The combination of claim 11, wherein said means indicating the distance said coupling member and gaging head move telescopically comprises a micrometer gage, and means mounting said gage in operative relation to said coupling member.

13. In a device for gaging quickly detachable female coupling members of the type having locking cams shiftable between coupling member locking positions and unlocked positions, the combination comprising a plurality of gaging heads of different predetermined sizes each adapted to receive for gaging a female coupling member of corresponding size, means for rigidly and readily releasable supporting in a predetermined operative position any one of said gaging heads so that heads can be interchangeably used and the device thereby adapted to gage couplings of different sizes, means mounting a female coupling member of a size corresponding to that of a selected gaging head in operative relation to the latter, movable means for shifting simultaneously said locking cams of said coupling member to and from coupling member locking positions and unlocked positions, means for indicating the force required to shift said cams to locking positions, means for indicaitng the distance said coupling member and head move telescopically with respect to each other when said locking cams are shifted to locking positions as aforesaid, and said locking cam shifting means as well as said means for indicating telescopic movement including adjustable means to accommodate the two for gaging coupling members of different sizes.

14. In a device for gaging quickly detachable female coupling members of the type having an internal gasket as well as locking cams shiftable to and from coupling member locking positions and unlocked positions, the combination comprising a gaging head formed to simulate the male member of a quickly detachable coupling, means mounting a female coupling member of corresponding size in operative relation to said gaging head, movable means for shifting simultaneously said locking cams of said coupling member between said locking positions and said unlocked positions, means for indicating the force required to shift said cams to said locking positions, said coupling member and gaging head compressing said gasket therebetween when said cams are in said locking position, means for measuring the amount of said compression of said gasket, said last means including a plurality of sensing elements, means for actuating said sensing elements by said coupling member during movement of said cams to said locking positions, a micrometer gage, means forming an operative connection between said micrometer gage and said sensing elements, said connecting means including averaging mechanism operative to produce a reading on said micrometer gage that is an average of the movements imparted to the individual sensing elements by said coupling member being gaged.

15. In a device for gaging quickly detachable female coupling members of the type having an internal gasket as well as locking cams shiftable to and from coupling member locking positions and unlocked positions; the combination comprising a gaging head formed to simulate the male member of the quickly detachable coupling, means mounting a female coupling member of a size corresponding to that of said gaging head in operative relation to the latter with the same bearing upon said gasket, movable means for shifting simultaneously said locking cams of said coupling member to and from said locking and unlocked positions, said movable means including separate torque measuring means for each cam, means operatively connecting said torque measuring means to said cams for measuring the torque required to move said cams to said locking positions, said coupling member and gaging head compressing said gasket therebetween with said cams in said locking positions, micrometer means for measuring the amount of compression of said gasket, said micrometer means comprising a plurality of sensing elements operatively connected to said coupling member for actuation thereby as the same is moved by said cams in a gasket compressing direction, a rocking beam, a micrometer gage operatively connected to one end of said rocking beam to indicate the extent of movement of the latter, a plate, a stem fixed to said plate substantially medially thereof to project normally therefrom, cooperating structure on a free end of said stem and the other end of said beam for seating said stem on said beam for limited universal tilting movement, said plate bearing on said sensing elements, and means for biasing said beam sufficiently at all times to confine said stem and plate between said beam and sensing elements respectively whereby movements of unequal extent imparted to the individual sensing elements during gaging of said coupling member cause said plate and stem to wobble on its connection with said rocking beam and thereby impart to the latter movement amounting to an average of the movement of said individual sensing elements.

16. A device for gaging the torque required pivotally to shift the locking cams and locking cam operating handles on the female member of a quickly detachable coupling of the type described to operative position for thereby locking the two members of the coupling together comprising a gaging head for receiving the female coupling member to be gaged, means rockable upon centers substantially aligned with the axes of pivotal movement of said locking cams, means for operatively connecting said locking cam operating handles and rockable means, means for positively counter-rocking said rockable means and thereby pivoting said locking cams simultaneously into or out of operative coupling locking position and means for indicating the torque applied by said rockable means to pivot said locking cams as aforesaid.

17. A gaging device according to claim 16, there being means for signalling when a predetermined torque is exceeded during the course of the rocking movement aforesaid.

18. A gaging device according to claim 16, there being means for automatically interrupting rocking movement of said counter-rocking means upon counter-rocking movement thereof through a predetermined angle.

19. A gaging device according to claim 16, there being means for adjusting the spacing between the axes of rocking movement of said rockable means in accordance with variations in the spacing of the axes of pivotal movement of said cams on said coupling members to be gaged thereby to adapt said device for gaging couplings of various sizes.

20. A device for gaging the torque required pivotally to shift the oppositely disposed operating handles for the locking cams on a quickly detachable coupling of the type described into and out of operative position for thereby locking the two members of the coupling together or unlocking the same comprising a fixedly supported gaging head for receiving the female coupling member of the coupling to be gaged, means rockable about centers substantially centered upon the axes of swinging movement of the locking cams on said coupling member including opposed elonagted members extending in opposite directions substantially radially from said centers, means for positively counter-rocking said rockable means and elongated members through predetermined angles and means for operatively connecting said oppositely extending elongated members adjacent the outer ends thereof to the oppositely disposed cam operating handles including torque indicating means between each of said elongated members and the said handles respectively, thereby separately to show the torque applied to the individual handles by said rockable elongated members when the latter are rocked.

21. A device for gaging the torque required pivotally to shift the oppositely disposed locking cams and locking cam handles on the female member of a quickly detachable coupling of the type described into and out of coupling locking operative positions; comprising a gaging head simulating a male coupling member for receiving said coupling member to be gaged, opposed cam handle operating members, means defining pivot axes upon which said operating members are pivotally rockable, means forming an operative connection between said opposite operating members and said opposed cam handles respectively on said coupling member on said gaging head so that said handles rock pivotally with said operating members, means for counter-rocking said operating members thereby pivotally to shift said handles in directions to pivot said cams into and out of oprative positions, and means to support said pivot axes of said operating members upon centers substantially coaxially of the centers of pivotal movemnt of said cams respectivly, said supporting means being adjustable to permit variations in the spacing between the pivot axes of said operating members in accordance with variations in the spacing between the centers of pivotal movemnt of said cams on said coupling members to be gaged, thereby to adapt said device for gaging coupling members of different sizes.

22. A device for gaging the torque required pivotally to shift the oppositely disposed locking cams and locking cam operating handles on the female member of a quickly detachable coupling of the type described into and out of operative coupling locking position comprising a frame, a gaging head rigidly mounted in said frame for receiving the coupling member to be gaged, a pedestal rigidly mounted on said frame on one side of head, a drive shaft rotatably mounted in said frame on an axis normal to the plane of said pedestal and to the axis of said gaging head, a pair of supports journaled adjacent one end thereof upon said shaft so as to be pivotally rockable in planes parallel to and in close proximity to said pedestal, a pair of operating members, means for pivotally supporting said operating members on said rockable support, respectively, including means cooperable with said pedestal fixedly to lock said support at positions substantially to align the axes of said operating members with the axes of the locking cams on the coupling member supported on said gaging head, a drive connection between said drive shaft and operating members pivotally to rock the latter in opposite directions when said drive shaft is rotated and means for operatively connecting said operating members to the oppositely extending cam operating handles on the coupling member positioned on said head so as pivotally to rock said handles and cams when said operating members are rocked pivotally, said connecting means including means to indicate the torque applied by said operating members to said handles.

23. A gaging device according to claim 22, wherein said device includes a fixed part formed and inscribed with indicia, pointers fixed to said rockable supports and movable therewith for indicating on said indicia the position of angular adjustment of said axes of said operating members carried by said rockable supports.

24. In a device for gaging quickly detachable female coupling members of the type having locking cams shiftable to and from coupling member locking positions and unlocked positions; the combination comprising a gaging head simulating the male member of the quickly detachable coupling, means mounting a female coupling member in operative relation to said gaging head, movable means for shifting simultaneously all of said locking cams of said female coupling member to and from said locking and unlocked positions, means for indicating the force required to shift said cams to said locking positions, and means for indicating the distance said coupling member and gaging head move telescopically relative to each other when said locking cams are shifted to said locking positions as aforesaid.

25. The combination of claim 24, wherein said means for indicating force, comprises a separate torque measuring means operatively associated with each cam.

26. A device for gaging female coupling members each having a gasket therein which is compressed when said coupling members are forced into operative coupling relation with counterpart coupling members, comprising substantially horizontally disposed upper and lower guide plates, a rigid stud projecting above said upper guide plate axially thereof, said stud having a shank extending downwardly through said plates and connecting the same together in vertically spaced relation, a plurality of gaging heads of different diameters, each gaging head simulating a male coupling member of a different size, means mounting any of said gaging heads on said stud, such gaging head being adapted to receive thereon a female coupling member of corresponding size, means for locking said coupling member on said head and thereby shifting the former downwardly to compress said gasket, said plates being formed with a plurality of groups of vertically aligned holes therethrough, said groups being disposed concentrically of said stud and shank at varying distances therefrom corresponding substantially to the radii of the diameters of the various sized coupling members to be gaged, a sensing rod for each hole of a group and freely slidable in said holes, said rods having upper ends extending above said upper plate and engaging a coupling member seated on said head and being moved downwardly thereby when said coupling member is shifted downwardly as aforesaid, a rocking beam having front and rear ends, a micrometer gage operatively connected to said front end of said beam to indicate the extent of upward movement of the latter, a wobble plate, a stem fixed to said wobble plate and depending therefrom axially thereof, cooperating structure on the free end of said stem and said rear end of said beam for seating said stem and wobble plate on said rear end of said beam for limited universal tilting movement, said sensing rods having rounded lower ends projecting below said lower guide plate and resting on said wobble plate, spring means biasing said rear end of said beam upwardly sufficiently at all times to confine said stem and wobble plate between said rear end of said beam and said sensing rods respectively whereby movements of unequal extent imparted to individual sensing rods during gaging of a coupling member causes said wobble plate to wobble on its connection with said rear end of said beam and thereby impart to the latter movement which in extent is an average of the movement of said individual sensing rods.

27. A device for measuring the torque required pivotally to shift the oppositely disposed locking cams and the handles thereof on the female member of a quickly detachable coupling of the type described into and out of operative locking positions, comprising a frame, a gaging head simulating a male coupling member, means rigidly mounting said head on said frame for receiving a coupling member to be gaged, a pedestal rigidly mounted on said frame rearwardly of said head, a drive shaft rotatably mounted on said frame on an axis normal to the plane of said pedestal and to the axis of said head, a pair of supports journalled adjacent lower ends thereof upon said shaft for individual pivotal rocking movement on said shaft in adjacent relation to said pedestal forwardly and rearwardly thereof, a pair of lifting arms, means mounting a lifting arm on each of said supports, said lifting arms extending forwardly of said pedestal on opposite sides thereof, drive means on said shaft, means operatively connecting said drive means to said lifting arms for oscillating the same in opposite directions, means limiting said oscillations to an arc of selected length, means for reversely oscillating said lifting arms through said arcs, said arms and pedestal including cooperating means for fixedly locking said supports in a plurality of selected positions in each of which the axes of said lifting arms will align with the axes of the cams of a coupling member of a different size mounted on a gaging head of corresponding size, said lifting arms having forward ends in laterally spaced and aligned relation to said gaging head, a pair of torque wrenches, means mounting said wrenches on said forward ends of said lifting arms so as to extend toward each other and said gaging head, means operatively connecting said torque wrenches to the handles of a coupling member seated on said head, said drive means being operative to pivotally rock said handles and cams to and from unlocked and coupling locking positions upon movement of said lifting arms through said arc, said pedestal having an upper end, indicia thereon designating proper positioning of said lifting arms for coupling members of varying sizes, and pointers operatively associated with said cooperative means to said lifting arms for indicating on said indicia the proper position for the axes of said lifting arms for alignment with cam axes of various sized coupling members.

28. The combination with the torque measuring means of claim 27, of a gasket compression measuring means comprising female coupling members each having a gasket therein which is compressed when said coupling members are forced into operative coupling relation with counterpart coupling members, comprising substantially horizontally disposed upper and lower guide plates, a rigid stud projecting above said upper guide plate axially thereof, said stud having a shank extending downwardly through said plates and connecting the same together in vertically spaced relation, a plurality of gaging heads of different diameters, each gaging head simulating a male coupling member of a different size, means mounting any of said gaging heads on said stud, such gaging head being adapted to receive thereon a female coupling member of corresponding size, means for locking said coupling member on said head and thereby shifting the former downwardly to compress said gasket, said plates being formed with a plurality of groups of vertically aligned holes therethrough, said groups being disposed concentrically of said stud and shank at varying distances therefrom corresponding substantially to the radii of the diameters of the various sized coupling members to be gaged, a sensing rod for each hole of a group and freely slidable in said holes, said rods having upper ends extending above said upper plate and engaging a coupling member seated on said head and being moved downwardly thereby when said coupling member is shifted downwardly as aforesaid, a rocking beam having front and rear ends, a micrometer gage operatively connected to said front end of said beam to indicate the extent of upward movement of the latter, a wobble plate, a stem fixed to said wobble plate and depending therefrom axially thereof, cooperating structure on the free end of said stem and said rear end of said beam for seating said stem and wobble plate on said rear end of said beam for limited universal tilting movement, said sensing rods having rounded lower ends projecting below said lower guide plate and resting on said wobble plate, spring means biasing said rear end of said beam upwardly sufficiently at all times to confine said stem and wobble plate between said rear end of said beam and said sensing rods respectively whereby movements of unequal extent imparted to individual sensing rods during gaging of a coupling member causes said wobble plate to wobble on its connection with said rear end of said beam and thereby impart to the latter movement which in extent is an average of the movements of said individual sensing rods.

References Cited by the Examiner
UNITED STATES PATENTS 2,021,842   11/1935   England _____________ 33—174
3,008,239   11/1961   Lange _______________ 33—143 X RICHARD C. QUEISSER, *Primary Examiner.*